Patented June 18, 1935

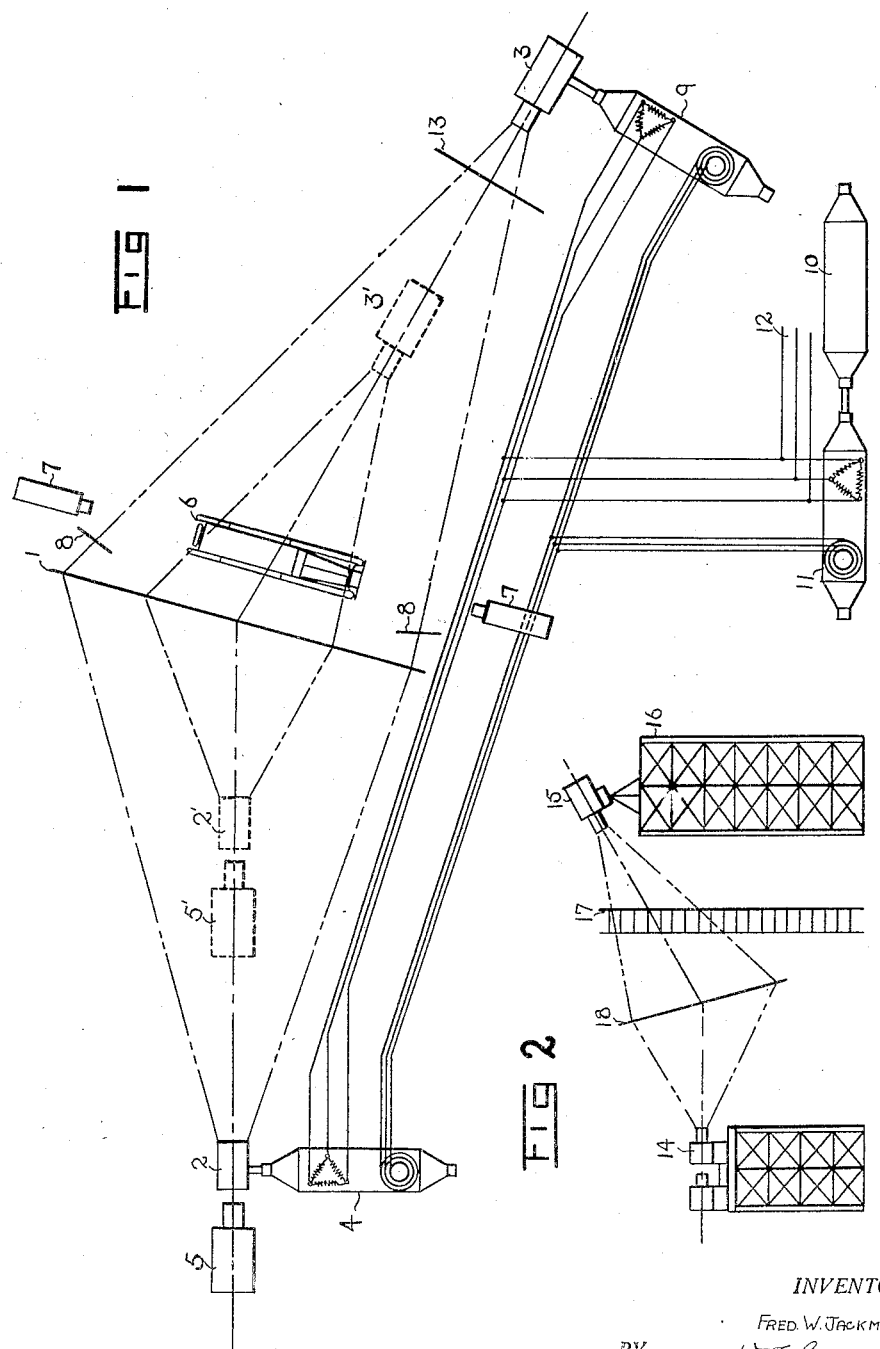

2,004,986

UNITED STATES PATENT OFFICE 2,004,986

COMPOSITE MOTION PICTURES

Fred W. Jackman, Beverly Hills, Calif., assignor to Warner Bros. Pictures, Inc., New York, N. Y., a corporation of Delaware Application May 25, 1931, Serial No. 539,818

4 Claims. (Cl. 88—16)

This invention relates to composite motion pictures, wherein a photograph or image of a background scene is combined with a foreground scene or action to produce a composite picture, whereby it appears that the action or foreground scene had been photographed at the actual scene shown in the background photograph.

It has previously been proposed to photograph action, such as one or more actors, before a translucent screen on which is projected a photograph of a background scene. The use of this arrangement for making composite pictures has led to certain difficulties, which I have overcome.

One difficulty has been encountered in making "close-ups" and "long shots" of the foreground scene before the translucent screen. When the camera is moved closer to the screen, a smaller field of view of the background scene is photographed by the camera, whereas, the background scene should remain the same. That is to say, a "close-up" or a "long shot" of an actor standing a mile or so in front of a mountain range would, in both pictures, show approximately the same amount of the mountain range. If that mountain range were photographed and the picture thereof projected onto the translucent screen, the camera would photograph a varying amount of the mountain range, depending upon the distance of the camera from the screen, whereas, it should photograph the same amount for both "close-ups" and "long shots" of action taking place before the screen. This defect has been overcome by changing the distance of the projector from the screen an amount corresponding to the change in the distance of the camera from the screen, whereby "close-ups" and "long shots" of the foreground may be obtained before the same background. The same result can be accomplished by changing the lenses in the camera and projector.

For further details of the invention, reference may be made to the drawing, wherein Fig. 1 is a plan view of a camera-projector arrangement for making composite pictures according to my invention, and Fig. 2 is a side elevation of a modification.

Referring to Fig. 1, the background scene, forming one component of the composite picture, is projected on the translucent screen I by means of the projector 2. This projector is operated in synchronism with the camera 3 by means of the motor 4 and the electrical interlock later described. There is provided for the projector 2 a lamp-house 5 containing a high intensity arc light. The camera 3 and the projector 2 are at opposite sides of the screen I and are angularly disposed with relation thereto in such a manner that the screen I bisects the angle between the camera and the projector.

The action, forming the other component of the composite picture, takes place on a stage between the camera 3 and the screen I. By way of example, this action may consist of one or more actors in the automobile 6, the scene on the screen I being a road scene taken by photographing a street while an automobile is being driven down the street. In the composite picture, as photographed by the camera 3, it, therefore, appears that the automobile 6 and the actors therein had actually been driven down that street.

The action which takes place in front of the screen I, for example, in the auto 6, is illuminated with light from the "Mazda" filament lamps 7, masks 8 preventing stray light from reaching the screen I. The lamps 7 are so positioned that they do not illuminate the screen I, as shown in the drawing, and the foreground scene 6 is spaced from the screen I and so related to the screen I and to the lamps 7 that this foreground scene does not cast a shadow on the screen I, or at least it does not cast a shadow on screen I within the field of view of the camera 3.

Due to the fact that an arc light, such as employed for the projector 2, has a relatively large amount of blue light, whereas an ordinary filament Mazda lamp, such as illustrated at 7, has a large amount of light of a substantially complementary color, i. e., red or yellow, the light reflected from the automobile 6 or action component is not reflected from the screen I into the camera.

In order that "close-ups" and "long shots" may be made with the action before substantially the same extent of background scene, on moving the camera 3 into the position 3' for making a "close-up", I move the projector 2' and its lamp-house 5' a corresponding amount. The same result can be obtained by changing the lens in either the projector or the camera, or both of them. In the case where the lens is changed in only one of them, the other machine, i. e., camera or projector, would have to be moved into a new position, as illustrated in the drawing, the result in all such cases being that "close-ups" and "long shots" of the action are taken with substantially the same field of view in the background.

The camera 3 is driven by the motor 9, which is provided with an electrical interlock, in order that motors 4 and 9 and the projector 2 and camera 3 driven thereby, respectively, may be operated in synchronism. This electrical interlock comprises a D. C. motor 10, which is compensated and speed-regulated. The motor 10 drives the distributor 11. The motors 4 and 9, and the distributor 11, are provided with three-phase field windings, as shown, and which are supplied with current from a power source 12. These three machines are each provided with three slip-rings connected to separated points on the armatures thereof, whereby the three armatures are electrically interlocked. This electrical interlock is now well understood in the art. Instead of the electrical interlock system shown, any other suitable mechanical or electrical interlock may be used for operating the projector 2 and camera 3 in synchronism.

If desired, the front shutter is removed from the projector 2, as I find that it is sufficient to merely use the customary shutter in the camera. The removal of the front shutter from the projector 2 gives a greater intensity of illumination of the screen 1 than would otherwise be the case.

In order that the actor or actors may watch the progress of the changing background scene on the screen 1, and guide their actions accordingly, I provide a mirror 13 out of the range of view of the camera 3 or 3' and so positioned that the actors on looking into the mirror 13 may see the scene on the screen 1. The mirror 13 is also useful in a similar way, in the case where the speech or music produced by the actors is being recorded in synchronism with the operation of the camera 3.

The camera 3 is fed with super-speed negative film, and the action in the auto 6, or the like, is illuminated with light of low intensity from the lamps 7, in order that the intensity of illumination of the action may be comparable to the intensity of the light in the background scene projected on screen 1 from projector 2.

Fig. 1 represents an arrangement where the camera and projector are out of optical alignment horizontally, whereas Fig. 2 illustrates a vertical misalignment of the projector 14 and the camera 15. In this case, the camera 15 is illustrated as being positioned on an elevated platform 16 in order to take a view—looking downwards—of the ladder 17 and of the actor (not shown) performing on the ladder 17 in the range of view of the camera 15. The translucent screen 18 receives a suitable background scene from the projector 14, and the camera 15 photographs a composite picture composed of the action on the ladder 17 and the background scene on the screen 18.

In Fig. 2, as in Fig. 1, the screen bisects the angle between the camera and the projector. The camera and projector of Fig. 2 may, of course, be provided with the various features illustrated and described in connection with Fig. 1.

Various modifications may be made within the scope of the appended claims.

I claim:

1. The method of producing composite pictures which comprises projecting a background scene onto a translucent screen, photographing action before said screen, changing the field of view of the camera employed for said photographing, changing the size of the projected field a corresponding amount and photographing the action with the changed projected field whereby "close-ups" and "long shots" of the action are obtained before the same background.

2. The method of producing composite pictures which comprises projecting onto a translucent screen a background scene representing a real background scene outside of the locus of said screen, photographing action before said screen, changing the distance from said screen of the camera employed for said photographing, changing the magnification on said screen of the projected background scene by an amount to compensate for the fact that the background scene projected on said screen represents a real background scene outside of the locus of said screen, and photographing the action with the magnification of said projected background scene thus changed, whereby "close-ups" and "long shots" of the action are obtained before substantially the same background that would be photographed if said camera had photographed said action before the real background scene instead of photographing a projected picture of the background scene at the locus of said screen.

3. The method of producing composite pictures which comprises projecting onto a translucent screen a background scene representing a real background scene outside of the locus of said screen, photographing action before said screen, changing the magnification of the image of said action in said camera, changing the magnification on said screen of the projected background scene by an amount to compensate for the fact that the background scene projected on said screen represents a real background scene outside of the locus of said screen, and photographing the action with the magnification of said projected background scene thus changed, whereby "close-ups" and "long shots" of the action are obtained before substantially the same background that would be photographed if said camera had photographed said action before the real background scene instead of photographing a projected picture of the background scene at the locus of said screen.

4. The method of producing composite pictures which comprises projecting onto a translucent screen a background scene representing a real background scene outside of the locus of said screen, photographing action before said screen, changing the magnification of the image of said action in said camera, changing the magnification on said screen of the projected background scene to compensate for said change of magnification of the image of said action in said camera, and photographing the action with the magnification of said action and of said projected background scene thus changed.

FRED W. JACKMAN.